United States Patent
Dillon (10) Patent No.: US 10,231,371 B2
(45) Date of Patent: Mar. 19, 2019

(54) SOIL COMPACTION MITIGATION ASSEMBLY AND METHOD

(71) Applicant: Tribine Industries LLC, Logansport, IN (US)

(72) Inventor: Ben N. Dillon, Logansport, IN (US)

(73) Assignee: Tribine Industries LLC, Logansport, IN (US)

( * ) Notice: Subject to any disclaimer, the term of this patent is extended or adjusted under 35 U.S.C. 154(b) by 35 days.

(21) Appl. No.: 15/636,728

(22) Filed: Jun. 29, 2017

(65) Prior Publication Data

US 2018/0014449 A1    Jan. 18, 2018

(51) Int. Cl.
| A01B 37/00 | (2006.01) |
| A01B 35/28 | (2006.01) |
| A01B 35/16 | (2006.01) |
| A01B 77/00 | (2006.01) |
| A01B 33/02 | (2006.01) |

(52) U.S. Cl.
CPC .............. *A01B 37/00* (2013.01); *A01B 35/16* (2013.01); *A01B 35/28* (2013.01); *A01B 33/021* (2013.01); *A01B 77/00* (2013.01)

(58) Field of Classification Search
CPC ........... A01B 37/00; A01B 35/16; A01B 7/00; A01B 9/003; A01B 21/02; A01B 21/04; A01B 33/02–33/024; A01B 39/08; A01B 39/085; A01B 63/008; A01B 63/114; A01B 63/32

See application file for complete search history.

(56) References Cited

U.S. PATENT DOCUMENTS

| 1,614,356 | A | * | 1/1927 | Whalley | A01B 33/021 |
| | | | | | 172/77 |
| 2,232,523 | A | * | 2/1941 | Gray | A01B 33/021 |
| | | | | | 172/112 |
| 3,193,021 | A | * | 7/1965 | Lane | A01B 33/021 |
| | | | | | 172/316 |
| 3,779,320 | A | * | 12/1973 | Cantone | A01B 33/021 |
| | | | | | 172/60 |
| 3,970,012 | A | * | 7/1976 | Jones, Sr. | A01B 21/04 |
| | | | | | 111/118 |
| 4,386,661 | A | * | 6/1983 | McCanse | A01B 33/12 |
| | | | | | 172/103 |
| 4,421,177 | A | * | 12/1983 | Schlapman | A01B 33/082 |
| | | | | | 172/123 |
| 4,892,154 | A | * | 1/1990 | Ranner | A01B 33/02 |
| | | | | | 172/112 |

(Continued)

FOREIGN PATENT DOCUMENTS

DE        855011 C  * 11/1952  ............. A01B 37/00

*Primary Examiner* — Matthew Troutman
(74) *Attorney, Agent, or Firm* — Mueller Law, LLC; Jerry K. Mueller, Jr.

(57) ABSTRACT

Disclosed is an assembly for mitigating soil compacted by wheels or belts of a vehicle moving over soil and carried by the vehicle. The assembly operates with a series of blades affixed to a rotatable shaft and displaying an elliptical pattern. A hood confines about the top half of the blades and spans about the width of the assembly. A motor rotates the rotatable shaft. A mounting assembly mounts the assembly to the vehicle behind and in alignment with the vehicle wheels or belts. A cylinder assembly reversibly moves the assembly from a home position downwardly into compacted soil for its mitigation.

11 Claims, 12 Drawing Sheets

(56) References Cited

U.S. PATENT DOCUMENTS

| | | | |
|---|---|---|---|
| 8,181,711 B1* | 5/2012 | Fraley | A01B 33/08 |
| | | | 172/107 |
| 9,439,339 B2* | 9/2016 | Hurd | A01B 37/00 |
| 9,516,799 B2* | 12/2016 | Olsen | A01B 33/02 |
| 2004/0149467 A1* | 8/2004 | Gilmer, Jr. | A01B 35/16 |
| | | | 172/542 |
| 2011/0147019 A1* | 6/2011 | Nusser | A01B 33/024 |
| | | | 172/315 |
| 2014/0166321 A1* | 6/2014 | Hurd | A01B 37/00 |
| | | | 172/239 |

* cited by examiner

SOIL COMPACTION MITIGATION ASSEMBLY AND METHOD

CROSS-REFERENCE TO RELATED APPLICATIONS

This application claims benefit of provisional application 62/363,381, filed Jul. 18, 2016.

STATEMENT REGARDING FEDERALLY SPONSORED RESEARCH

Not applicable.

BACKGROUND

The present disclosure relates to mitigation of soil compaction caused by heavy vehicles and more particularly to self-soil compaction by the heavy vehicles that cause such soil compaction, such as typified by a harvesting combine.

Soil compaction, as we know it today, is caused primarily by heavily laden vehicles supported by tires or crawler lugged belts passing over the soil, and certain tillage tools, such as a disc, which compresses the soil as it pushes the soil sideways. Even standing water can cause soil compaction. Soil compaction reduces the ability of the soil to absorb water and air and, therefore, reduces crop yields and increases soil erosion. The degree to which soil is compacted by a specific weighted axle passing over it is affected by the ratio of silt to sand and the percent moisture in the soil. The more fine silt particles and higher moisture content, the more the soil compacts, forms tracks or ruts, and reduces water and air movement.

Tracks or depressions in the soil caused by tires or crawler lugs in a high moisture content area of soil changes as the soil dries out. The compacted areas of soil tend to become harder, retain their shape, and set up similar to the brick-making process. Therefore, it is advantageous and requires less energy to till the soil and break up shapes of soil immediately after it is deformed by compaction and prevent the "bricks" from forming. Soil tilled immediately after being compacted also restores the air and water movement process. An untended compacted wheel track or rut will fill with water and hold it for a long period of time until it is tilled. This is a major problem for a farmer using the no-till growing system. The lowest cost scenario is to apply nutrients and seed into the soil as left by the harvesting machine with no separate tillage steps between harvesting and planting.

This disclosure is directed to the remediation of compacted soil by the very vehicle creating the compacted soil condition.

BRIEF SUMMARY

The most advantageous mechanism to remove axle load tracks and the underlying compaction is a system, which is integrated into the vehicle that is forming the tracks, such as, for example, a tractor, grain harvester, or grain transporter. The compaction mitigation method or tool should not add to the compaction or throw soil sideways, such as does a disc harrow. The compaction mitigation system should leave the soil nearly level and containing as much air or as "fluffy" as possible. In the case of harvesting, it should mix crop residue into the soil and chop off weeds. It should be effective regardless of the shape of the compacted tracks resultant of the tire or crawler track lugs. The general shape of a compacted track is elliptical with the highest level of compaction in the center of the ellipse. Therefore, the center of the ellipse requires the deepest penetration by the compaction mitigation tool. Mitigating the compaction track during the harvesting process would result in a major cost reduction by eliminating the need to deep rip the entire harvested field.

Disclosed, then, is an assembly for mitigating soil compacted by wheels or belts of a vehicle moving over soil and carried by the vehicle. The assembly operates with a series of blades affixed to a rotatable shaft and displaying an elliptical pattern. A hood confines about the top half of the blades and spans about the width of the assembly. A motor rotates the rotatable shaft. A mounting assembly mounts the assembly to the vehicle behind and in alignment with the vehicle wheels or belts. A cylinder assembly reversibly moves the assembly from a home position downwardly into compacted soil for its mitigation.

BRIEF DESCRIPTION OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION

Figure 1:
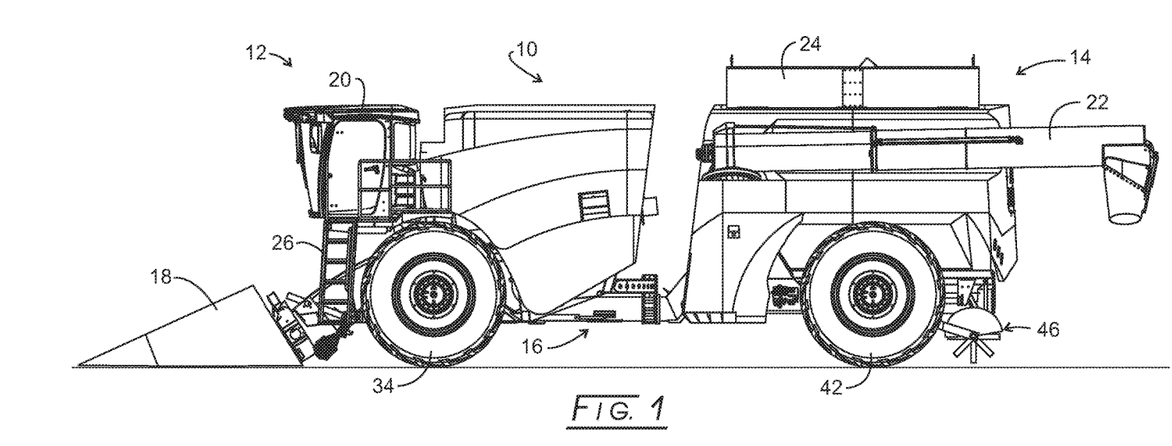
FIG. 1 is a side elevation view of an articulated combine fitted with the disclosed soil compaction mitigation assembly in an up or home (idle) position.
Figure 2:
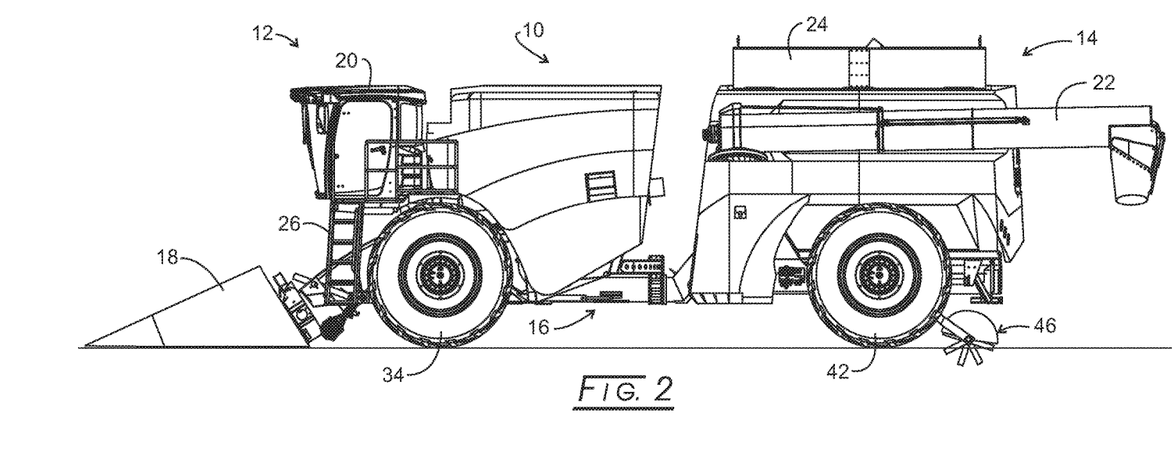
FIG. 2 is a side elevation view of an articulated combine fitted with the disclosed soil compaction mitigation assembly in a down or working (active) position.

Referring initially to FIGS. 1 and 2, an articulated harvester, 10, consists of a powered PPU (crop processing power unit), 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. The operator is granted access to cab 20 by a stair assembly, 26, that extends upwardly from just above the ground and is more fully disclosed in commonly owned application Ser. No. 15/654,786, filed Jul. 20, 2017, now abandoned (U.S. Provisional 62/375,986).

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015, now U.S. Pat. No. 9,901,030.

Figure 3:
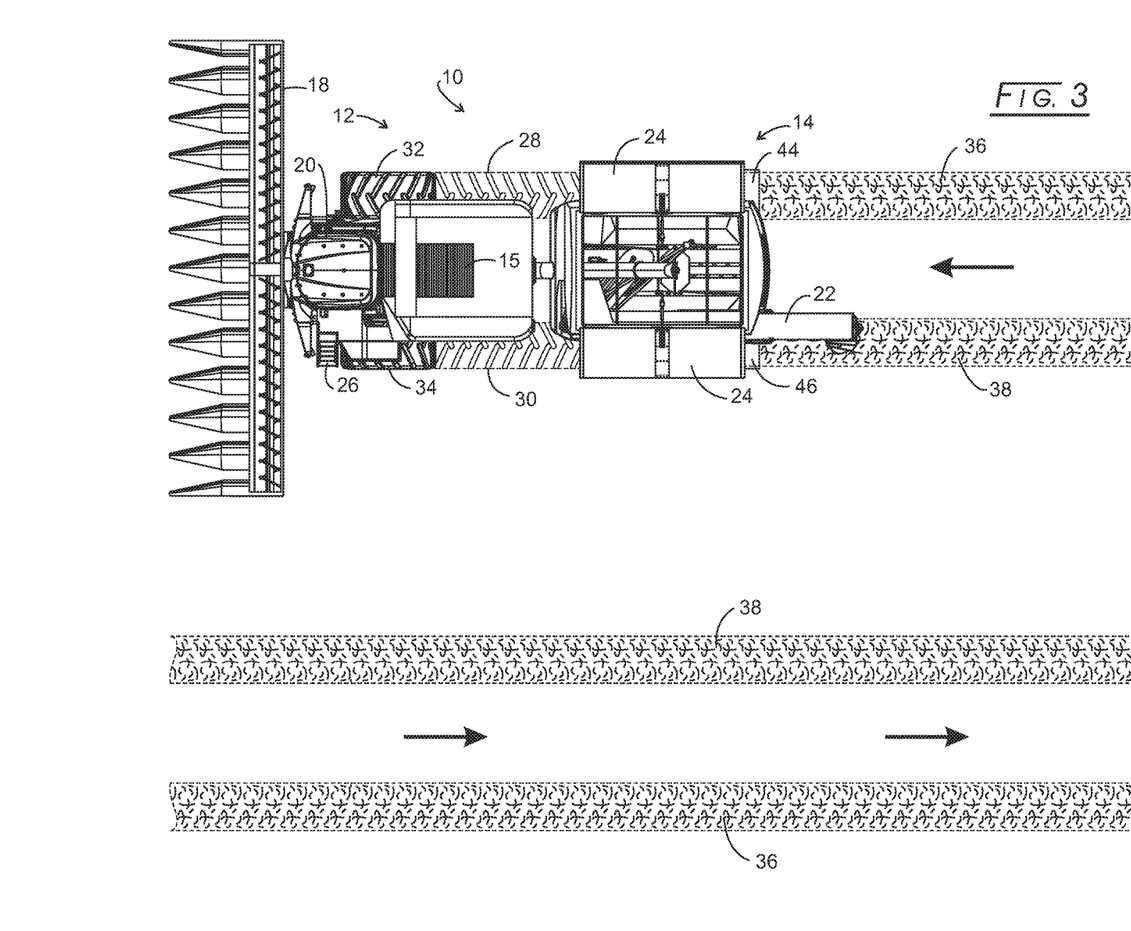
FIG. 3 is an overhead view of the articulated combine of FIG. 1 showing remediated tracks resultant of the disclosed soil compaction mitigation assembly.

In FIG. 3, tracks, 28 and 30, caused by wheels, 32 and 34, respectively, of PPU 12 are seen. The rear wheels for grain cart 14 will just reinforce tracks 28 and 30 by moving in these tracks when articulated combine 10 is driven in a straight line. Two sets of tracks may be created when articulated combine 10 turns in either direction. The disclosed soil compaction mitigation assemblies carried by rear grain cart 14 create remediated tracks, 36 and 38, from tracks 28 and 30, respectively. Remediated tracks, 36 and 38 are characterized by aerated or fluffy soil with weeds having been cut and organic matter (e.g., MOG or "material other than grain" and weeds) being mixed in with the soil.

Figure 4:
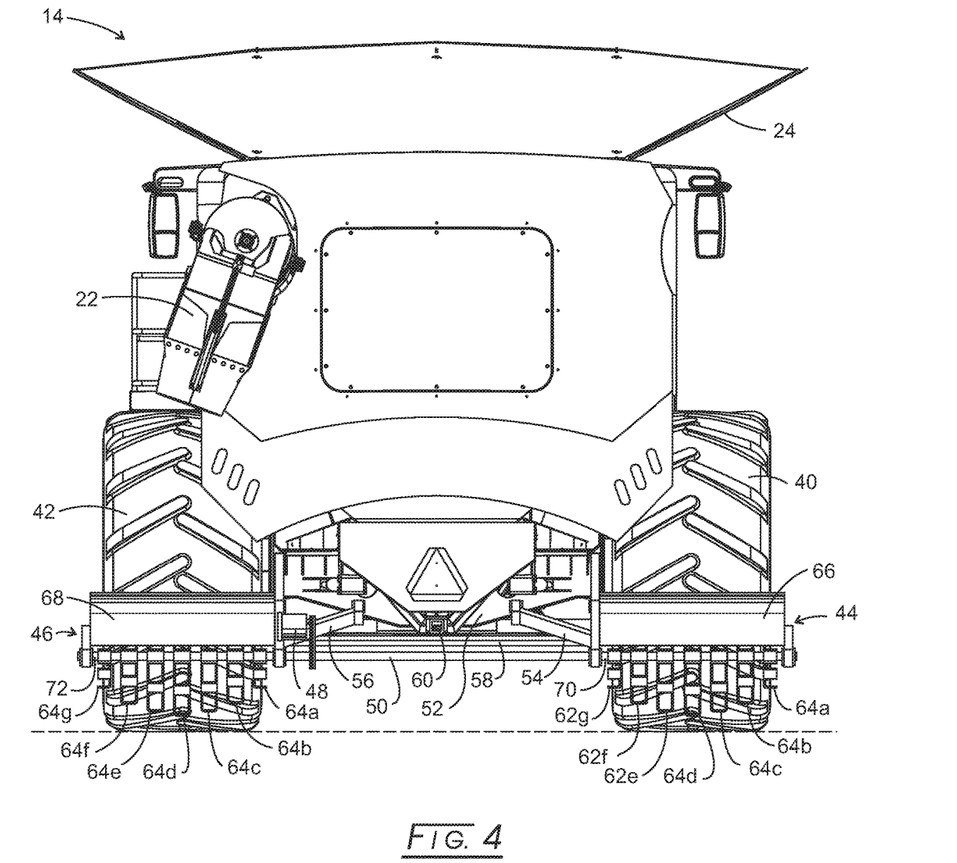
FIG. 4 is a rear view of the articulated combine of FIG. 1 showing the disclosed soil compaction mitigation assemblies in the up or home (idle) position.

Referring to FIG. 4, rear wheels, 40 and 42, of rear grain cart 14 add to the soil compaction of front wheels 32 and 34. Compacted soil tracks are mitigated with soil compaction mitigation assemblies, 44 and 46, carried by rear grain cart 14 and being in alignment with rear wheels 40 and 42. The width of mitigation assemblies 44 and 46 desirably are at least as wide at rear wheels 40 and 42 with additional width helping to mitigate the wider compacted tracks left by a turning combine. Mitigation assemblies 44 and 46 are in an up or home or idle position in FIG. 4. They can be attached to the axle assembly for rear wheels 40 and 42. They may operate independently or they may be synchronized. Various embodiments will be explored below. For the articulated combine in the drawings, the axle for the towed grain cart is steerable.

Figure 5:
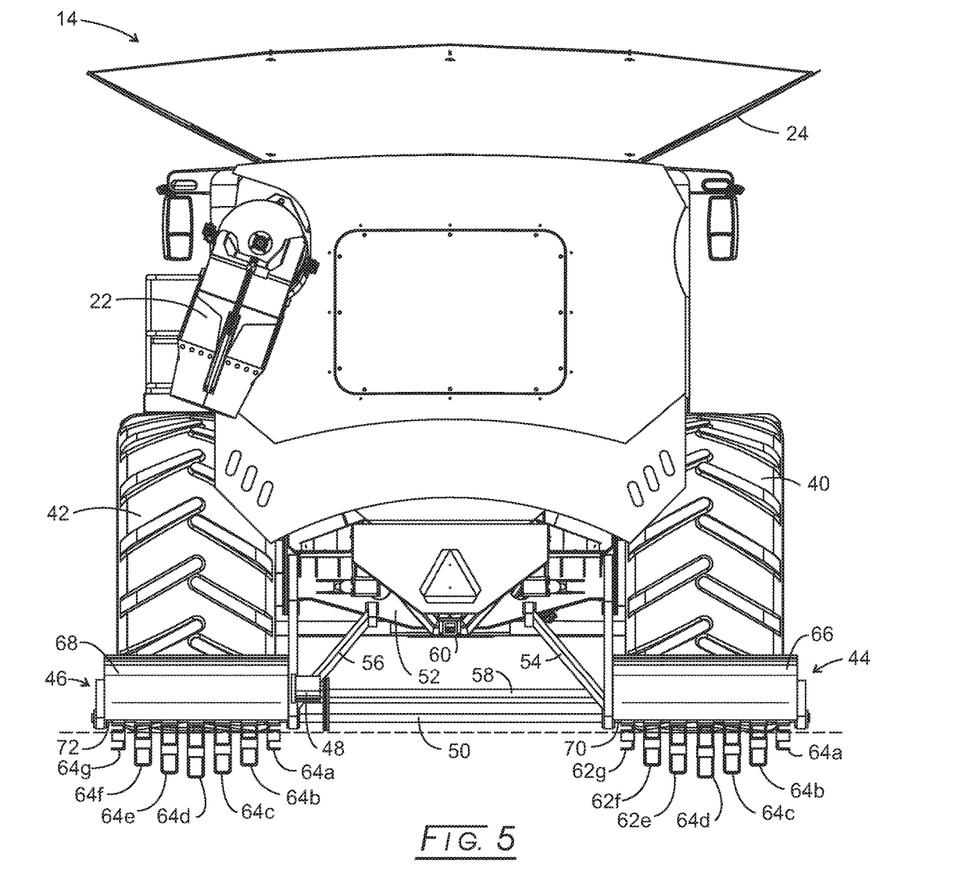
FIG. 5 is a rear view of the articulated combine of FIG. 1 showing the disclosed soil compaction mitigation assemblies in a down or working (active) position.
Figure 6:
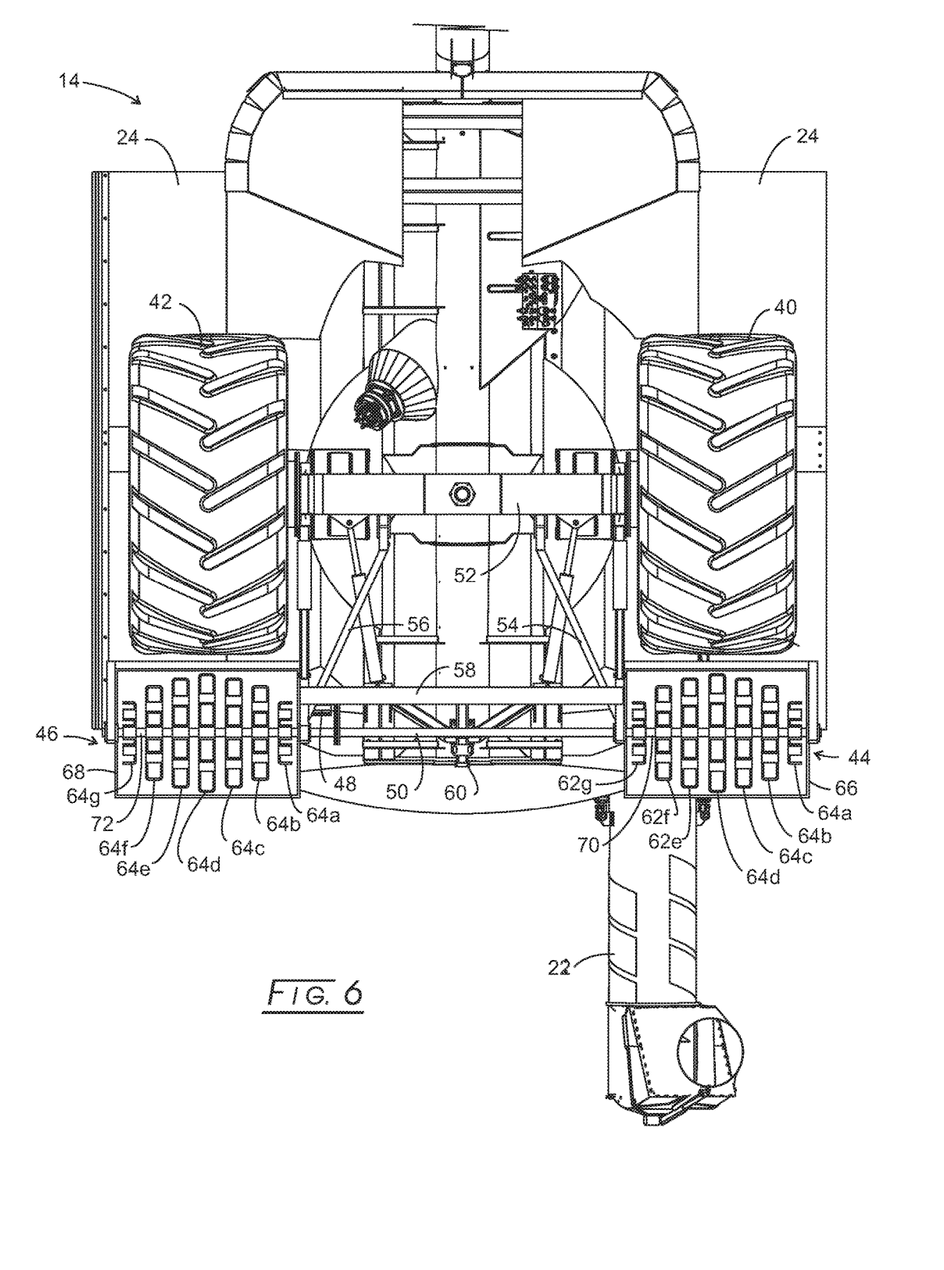
FIG. 6 is a bottom view of the articulated combine of FIG. 1 showing the disclosed soil compaction mitigation assemblies.

Mitigation assemblies 44 and 46 are in a down or operating (track mitigating) position in FIG. 5. A hydraulic motor, 48, drives mitigation assemblies 44 and 46. A rotating connector shaft, 50, driven by motor 48 to assemblies 44 and 46, drives both assemblies synchronously. Both assemblies are connected to an axle, 52, for rear grain cart 14 by a pair of braces, 54 and 56, connected, respectively, to assemblies 44 and 46 (see also FIG. 6). A metal bar or bracket, 58, runs between assemblies 44 and 46 to complete the triangular structural support assemblies therefor. Other structural configurations could be envisioned for assemblies 44 and 46, provided that they did not interfere with a hitch assembly, 60, carried by rear grain cart or its use in towing.

Assemblies 44 and 46 have a series of rotating blades, 62a through 62g, for assembly 44, and 64a through 64g, for assembly 46. Given the generally elliptical nature of the compacted tracks, blades 62d and 64d will be the longest with the blade pattern also being generally elliptical, as illustrated in FIG. 5. It should be recognized that the length of the blades is drawn for illustration and not necessarily to scale for elliptical tracks encountered in the field. Each set of rotating blades rotates within generally semi-circular hoods, 66 and 68, for assemblies 44 and 46, respectively. The rotating blades are fixed to a rotating shaft, 70, for assembly 44, and 72, for assembly 46. Motor 48 drives rotating shaft 72 and shaft 70 via rotating connector shaft 50.

Figure 7:
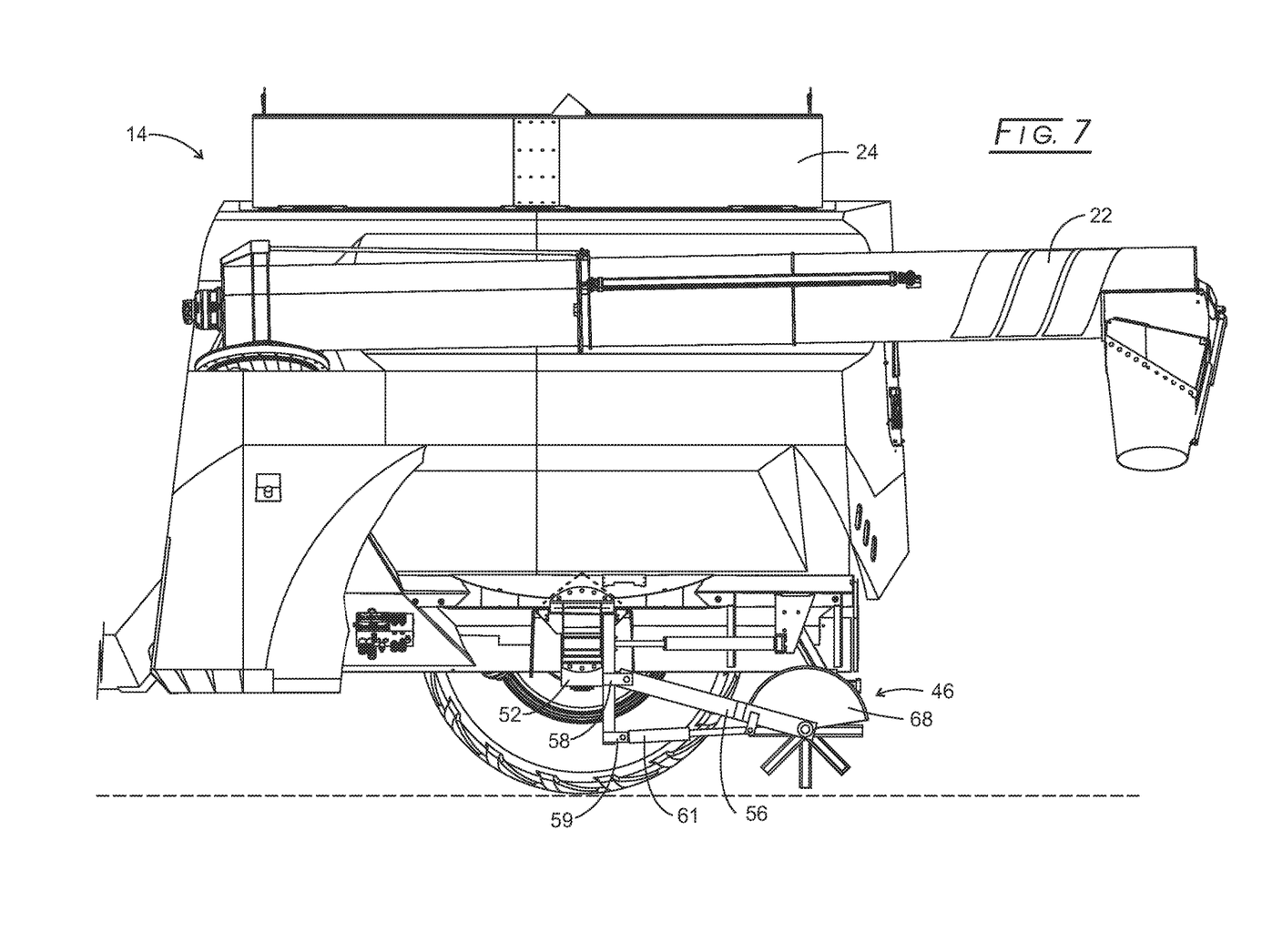
FIG. 7 has the rear wheel assembly removed to show the disclosed soil compaction mitigation assembly in the up or home/idle position.
Figure 8:
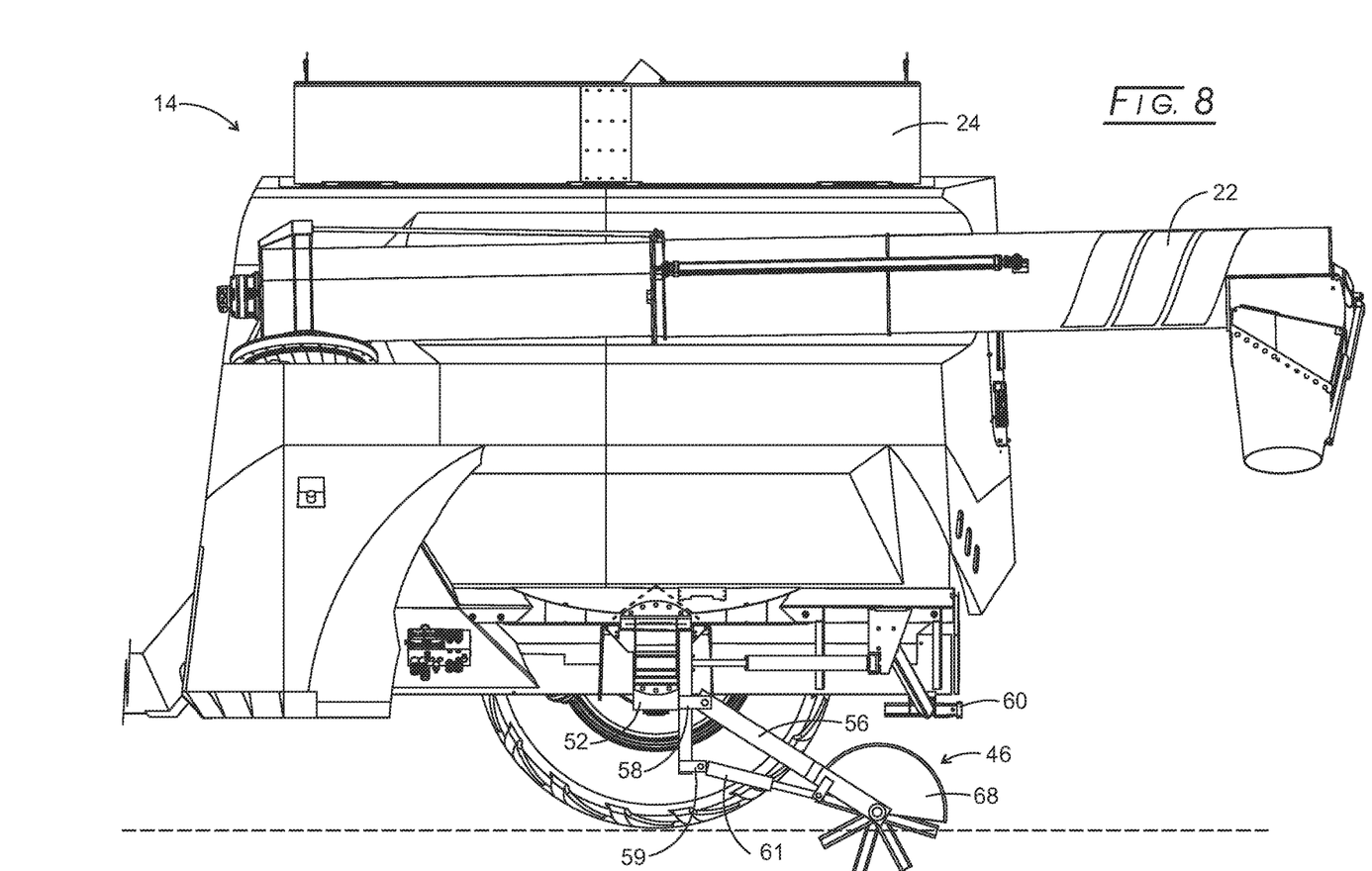
FIG. 8 has the rear wheel assembly removed to show the disclosed soil compaction mitigation assembly in a down or working (active) position.
Figure 9:
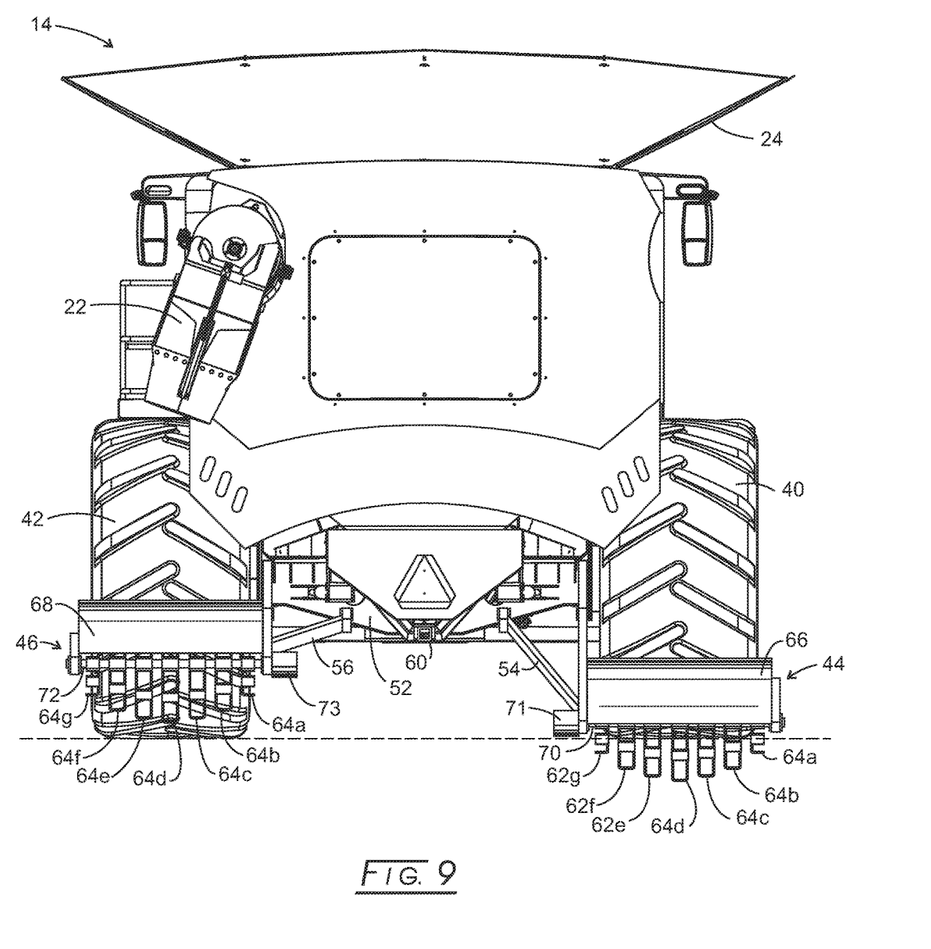
FIG. 9 is a rear view of the articulated combine of FIG. 1 showing one of the disclosed soil compaction mitigation assemblies in the up or home/idle position and the other disclosed soil compaction mitigation assembly in a down or working (active) position.
Figure 10:
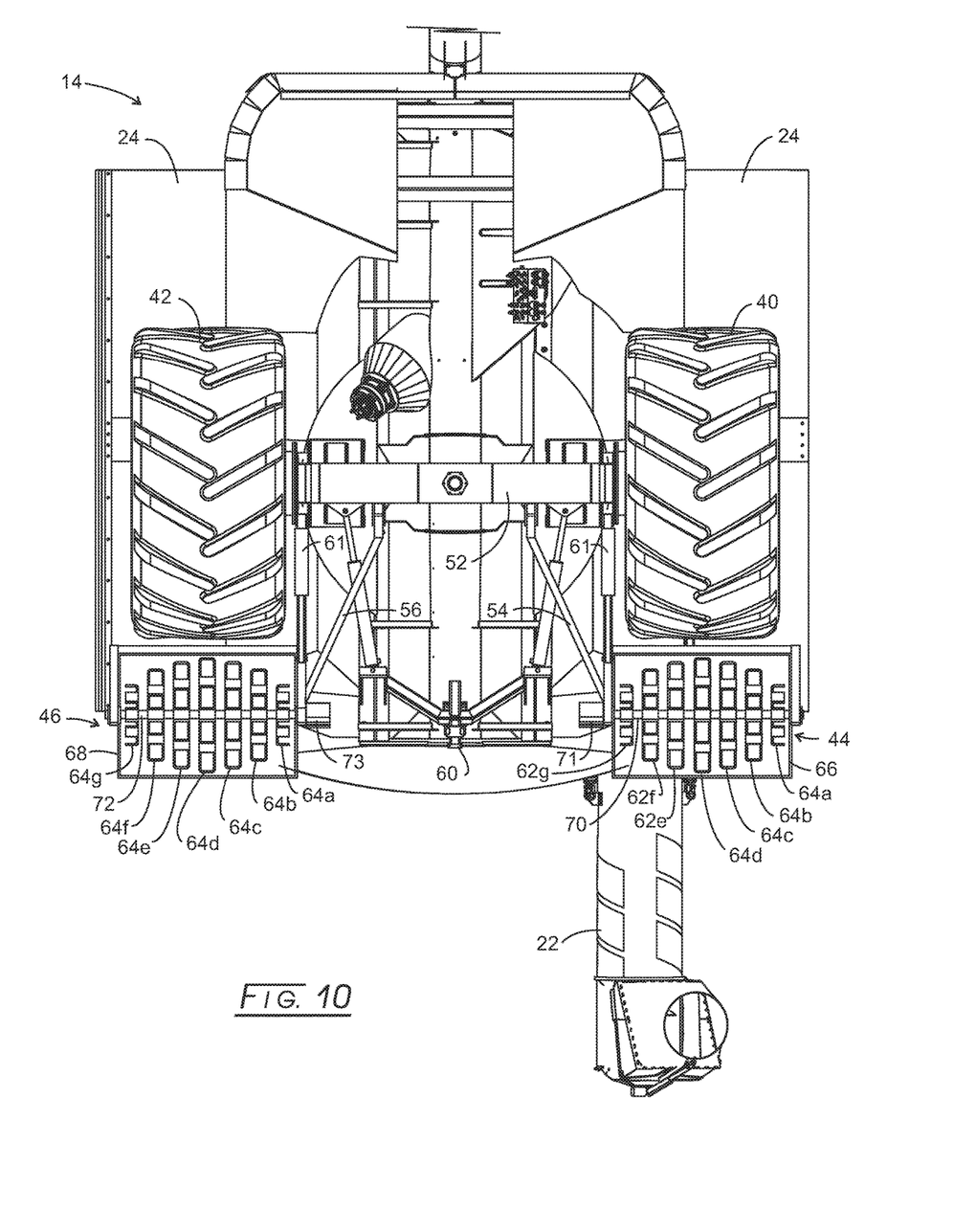
FIG. 10 is a bottom view of the articulated combine of FIG. 9.

Referring additionally to FIGS. 7 and 8 and specifically to assembly 46, brace 56 is pivotally attached to a bracket, 58, carried by axle 52 about its center. Another bracket, 59, is carried towards the bottom of axle 52 and pivotally joins one end of a cylinder, 61, with the other end of cylinder 61 pivotally connected to assembly 46 for pivoting assembly 46 from its up or home position to a down or active/operating position. Assembly 44 will have an identical cylinder assembly and brackets carried by axle 52 to raising and lowering assembly 44. The cylinder assemblies can be attached to bar 58 spanning between the assemblies or independently to each assembly. FIGS. 9 and 10 shows a configuration of assemblies with bar 58 and rotating connector shaft 50 removed where shafts 71 and 73 driven by their own motors and each cylinder assembly independently raises and lowers each assembly. In FIG. 9, assembly 44 is in a down or operating position, while assembly 46 is in a raised or home position. It will be appreciated that any cylinder assembly could be hydraulic, pneumatic, or electric driven, and could be a linear actuator, electric motor, or other powered device.

With additional reference to FIG. 8, the semi-circular shape of hood 68 is seen; although, it should be recognized that additional shapes may be used. Hood 68 (and similarly hood 66) performs important functions in the operation of the assemblies given that it is desired that the remediated tracks be generally even with the adjoining soil and that no soil should be thrown outside of the tracks. In the down or operating position, the trailing edge of hood 68 is set generally at about the level of the adjoining soil so that such trailing edge creates the level and smoothness desired of the remediated tracks. Additionally, hood 68 functions to retain the soil churned up by the blades from being thrown. Hood 68 confines the churned up soil to be retained therewithin with the trailing edge then performing its function. To that end hoods 66 and 68 also have sides for trapping the loose soil.

Figure 11:
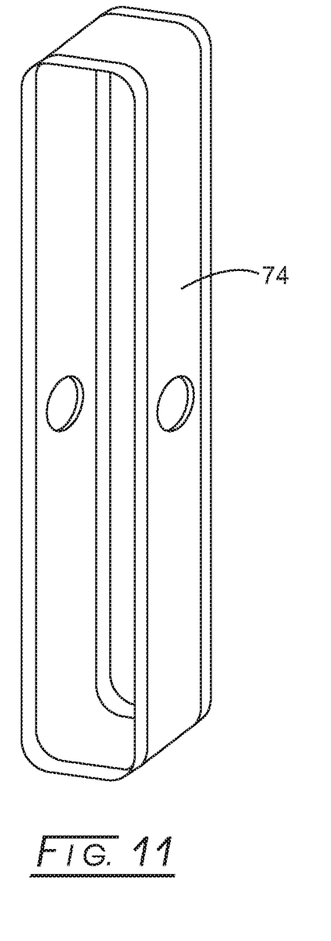
FIG. 11 is an isometric view of a blade for the disclosed soil compaction mitigation assembly.
Figure 12:
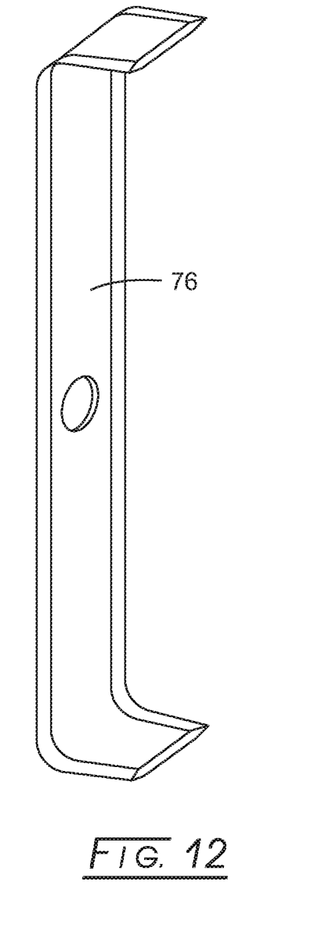
FIG. 12 is an isometric view of an alternative blade for the disclosed soil compaction mitigation assembly.
Figure 13:
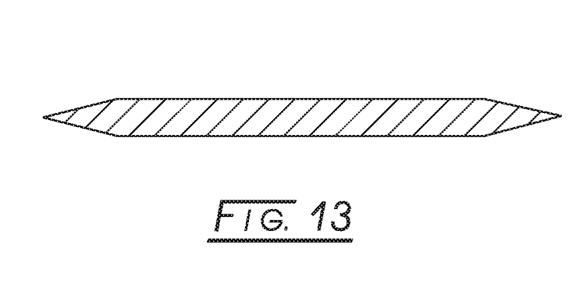
FIG. 13 is a cross-sectional view a portion of the blades of FIGS. 11 and 12 showing their dual cutting or sharpened edges.

Referring now to FIG. 11, a blade, 74, having a generally elongated "O" configuration has a pair of apertures through the center of each long side through which rotating shaft 70 or shaft 72 is placed for rotating of blade 74. In the drawings, all of the blades, but for the end blades, are shown in this configuration, which is a known blade configuration. In FIG. 12, a blade, 76, is shown as a generally elongated "C" with a central aperture for a rotating shaft. This is the end blade configuration shown in the drawings. Of course, a variety of different blade configurations could be used in accordance with this disclosure. In order for the blades to be effective in churning up the compacted tracks, their edges need to be sharp. FIG. 13 shows a cross-section of either blade 74 or blade 76 with both edges being sharpened. This is because the blades in assemblies 44 and 46 can be reversed in rotational direction. This enables the machine to which the assemblies are attached to remediate tracks whether the machine is going forward or backward. In order for the blades to be effective in both a forward direction and a rearward (backing up) direction, they need to be sharp on both edges, as shown in FIG. 13.

Figure 14:
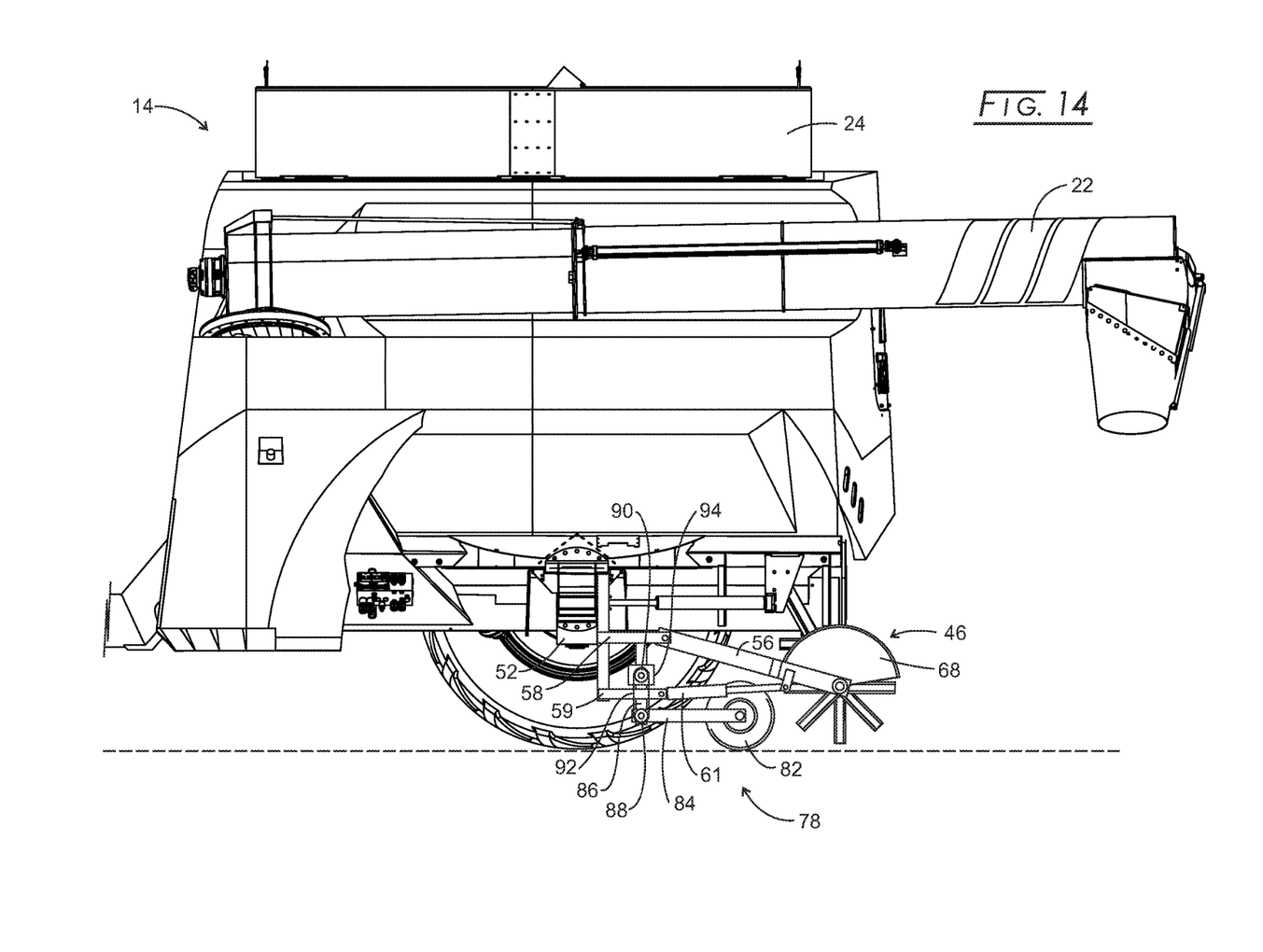
FIG. 14 is an alternative embodiment where the rear wheel assembly is removed to show the disclosed soil compaction mitigation assembly in the up or home/idle position and fitted a sensing wheel correlative with the depth of the wheel rut.
Figure 15:
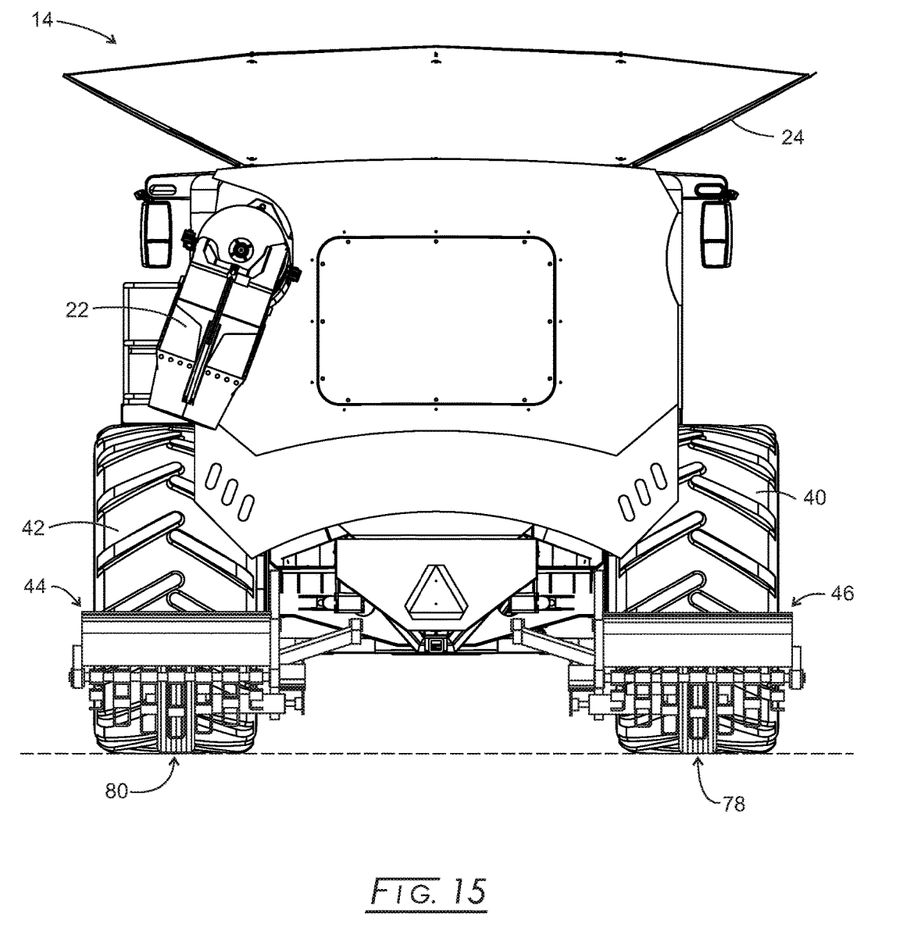
FIG. 15 is rear view of the alternative embodiment shown in FIG. 14.

With reference to FIGS. 14 and 15, illustrated is an alternative and currently preferred embodiment wherein provision is made to determine the depth of the wheel rut in order adjust assemblies 44 and 46 to the determined or sensed wheel rut depth. While a variety of sensing systems can be envisioned, a representative such sensing system is illustrated where a wheel assemblies, 78 and 80. A detailed description of wheel assembly 78 will be given for illustrative purposes, it being understood that wheel assembly 80 will be substantially the same. Wheel assembly 78 includes a wheel, 82, carried by a generally horizontal bracket, 84, pivotally attached to a generally vertically oriented bracket, 86, which is turn is attached at its upper end to bracket 58, which has been extended in length from the embodiment illustrated in FIGS. 7 and 8. Additionally a sprocket, 88, is carried where brackets 84 and 86 pivotally connect, as is a sprocket, 90, at the upper end of bracket 86. A chain, 92, runs around sprockets 88 and 90. Additionally, a sensor, 94, is located with sprocket 90 and senses the rotation of sprocket 90 resulting from the rotation of sprocket 88 resulting from the position of wheel assembly 78 as it travels in the wheel rut. Sensor 94 in turn is used to determine the depth for assembly 46, which is determined by cylinder assembly 61 in conventional fashion. The skilled artisan will appreciate that, while wheel assemblies 78 and 80 could be coordinated to operate in unison (same depth), it may be advantageous that each operate independently to account for the depth of each wheel rut being different due to, for example, terrain, soil type, soil density, and/or a variety of additional factors.

Alternative to the foregoing discussion regarding wheel 82 in FIGS. 14 and 15, cylinder 56 could be in a free-float mode so that wheel 82 and assembly 46 moved up and down in concordance. Essentially, assembly 46 would follow the ups and downs of wheel 82. Of course, assembly 46 would be set to a pre-determined depth level relative to wheel 82 and thereafter follow the up and down movement of wheel 82.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. All citations referred herein are expressly incorporated herein by reference.

I claim:
1. An assembly for mitigating soil compacted by wheels or belts of a vehicle moving over soil and carried by the vehicle, comprising:
   (a) an elliptical series of blades affixed to a rotatable shaft;
   (b) a hood confining about the top half of the blades and spanning about the width of the soil mitigation assembly;
   (c) a motor for rotating the rotatable shaft;
   (d) a mounting assembly for mounting the soil mitigation assembly to the vehicle behind and in alignment with the vehicle wheels or belts;
   (e) a cylinder assembly for reversibly moving the soil mitigation assembly from a home position downwardly into compacted soil for its mitigation; and
   (f) a pivotally mounted wheel assembly located between the soil mitigating assembly and the vehicle wheels or belts and comprising:
      (i) a rotating wheel assembly located in the compacted soil created by the vehicle wheels or belt; and
      (ii) a pivot assembly including a sensor for determining the rotating wheel assembly depth in the compacted soil, wherein the sensor determines the depth the cylinder assembly moves the soil mitigation assembly downwardly into the compacted soil.

2. The soil mitigating assembly of claim 1, wherein a respective one of the two of the soil mitigating assemblies is mounted behind each wheel or belt of the vehicle.

3. The soil mitigating assembly of claim 2, wherein each of the two soil mitigating assemblies operates independently of the other.

4. Method for mitigating soil compacted by wheels or belts of a vehicle moving over soil and carried by the vehicle, comprising the steps of:
   moving the vehicle over soil, the vehicle carrying a pair of soil mitigating assemblies, one each mounted behind and in alignment with each of the vehicle wheels or belts, said soil mitigating assembly comprising:
   (a) an elliptical series of blades affixed to a rotatable shaft;
   (b) a hood confining about the top half of the blades and spanning about the width of the soil mitigation assembly;
   (c) a motor for rotating the rotatable shaft;
   (d) a mounting assembly for mounting the soil mitigation assembly to the vehicle behind and in alignment with the vehicle wheels or belts;
   (e) a cylinder assembly for reversibly moving the soil mitigation assembly from a home position downwardly into compacted soil for its mitigation; and
   (f) a rotating wheel assembly is located in the compacted soil created by the vehicle wheels or belt and is cooperatively associated with the soil mitigating assembly for the soil mitigating assembly following the up and down movement of the rotating wheel assembly.

5. The method of claim 4, wherein the soil mitigating assemblies operate independently.

6. An assembly for mitigating soil compacted by wheels or belts of a vehicle moving over soil and carried by the vehicle, comprising:
   (a) an elliptical series of blades affixed to a rotatable shaft;
   (b) a hood confining about the top half of the blades and spanning about the width of the soil mitigation assembly;
   (c) a motor for rotating the rotatable shaft;
   (d) a mounting assembly for mounting the soil mitigation assembly to the vehicle behind and in alignment with the vehicle wheels or belts;

(e) a cylinder assembly for reversibly moving the soil mitigation assembly from a home position downwardly into compacted soil for its mitigation; and (f) a rotating wheel assembly located in the compacted soil created by the vehicle wheels or belts and being cooperatively associated with the soil mitigating assembly for the soil mitigating assembly following an up and down movement of the rotating wheel assembly.

7. The soil mitigating assembly of claim 6, wherein a respective one of the two of the soil mitigating assemblies is mounted behind each wheel or belt of the vehicle.

8. The soil mitigating assembly of claim 7, wherein each of the two soil mitigating assemblies operates independently of the other.

9. An assembly for mitigating soil compacted by wheels or belts of a vehicle moving over and carried by the vehicle, which comprises:

(a) the vehicle comprising an articulated harvester comprising a forward crop processing power unit and a rear grain cart having wheels or belts;

(b) an elliptical series of blades affixed to a rotatable shaft;

(c) a hood confining about the top half of the blades and spanning about the width of the soil mitigation assembly;

(d) a motor for rotating the rotatable shaft;

(e) a mounting assembly for mounting the soil mitigation assembly to the grain cart behind and in alignment with each of the grain cart wheels or belts; and (f) a cylinder assembly for reversibly moving the soil mitigation assembly from a home position downwardly into compacted soil for its mitigation; and (g) a rotating wheel assembly located in the compacted soil created by the vehicle wheels or belts and being cooperatively associated with the soil mitigating assembly for the soil mitigating assembly following an up and down movement of the rotating wheel assembly.

10. The assembly of claim 9, wherein a respective one of the two of the soil mitigating assemblies is mounted behind each wheel or belt of the grain cart.

11. The soil mitigating assembly of claim 9, wherein each of the two soil mitigating assemblies operates independently of the other.

* * * * *